May 15, 1962  M. KORNBLUTH  3,034,915
STRIPPABLE COATING MATERIAL AND METHOD
Filed Jan. 29, 1959
FIG. 1.
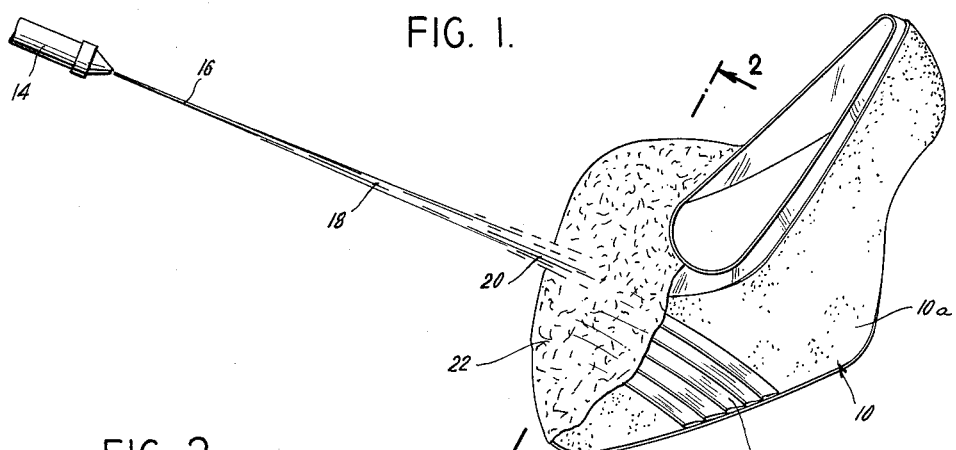
FIG. 2.
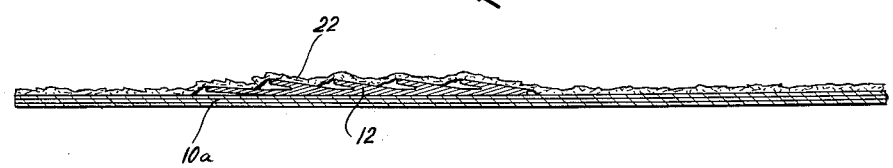
FIG. 4.
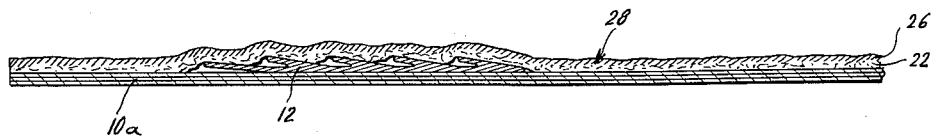
FIG. 3.
FIG. 5.
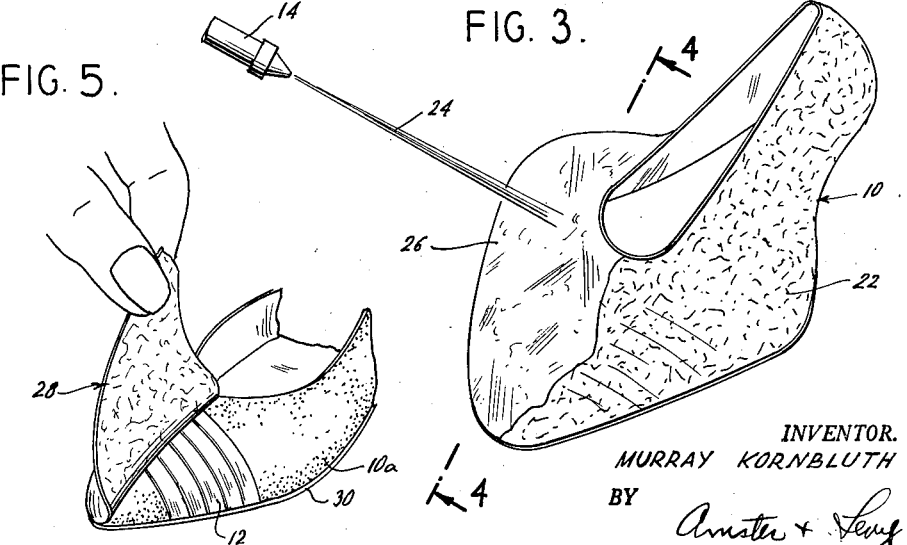
INVENTOR.
MURRAY KORNBLUTH
BY Amster + Levy
ATTORNEYS

United States Patent Office 3,034,915
Patented May 15, 1962

3,034,915
STRIPPABLE COATING MATERIAL AND METHOD
Murray Kornbluth, Bronx, N.Y., assignor to Guard Coatings Corporation, Long Island City, N.Y., a corporation of New York
Filed Jan. 29, 1959, Ser. No. 789,839
4 Claims. (Cl. 117—6)

The present invention relates generally to the protection of porous surfaces of articles during their fabrication, and in particular to a strippable protective coating for such surfaces, a material from which such coatings can be formed, and a method for applying it to porous surfaces.

In the process of fabricating many articles, for example, shoes, the articles are in danger of becoming damaged during the manufacturing process through the soiling or abrasion thereof. It is customary to protect these articles from such damage by covering their sufaces with a flexible and somewhat resilient protective coating which keeps out dirt and shields the surface against scuffing and scratches. Such coatings are formulated in such a manner that they can be applied in a liquid form, after which they dry to form a plastic film which can subsequently be peeled off when the process of fabrication is completed.

As applied to articles fabricated of porous materials, such as leather and fabric, this procedure runs into difficulty. The porous surfaces of such materials have a tendency to absorb the coating material when it is applied thereover in liquid form. As a result, when the coating material dries into a film it tends to bond to the porous surface. This renders complete peeling of the coating difficult, if not impossible, and creates a danger that portions of the porous surface of the article will be torn off with the coating.

In the past this problem forced the use of an undercoating, made of a substance different from the coating material, to prevent the porous surface from absorbing the coating and permit the latter to be peeled off. In some cases, for example, a dilute acid solution was sprayed on the porous surface to prevent absorption of a subsequent overcoat of a water emulsion of latex by coagulating the latex. In the case of white suede surfaces, a powder such as talc or chalk was used to form a barrier to penetration by the latex emulsion.

Accordingly, it is broadly the object of this invention to provide a strippable protective coating for porous surfaces, the coating being easily applied by spraying and easily stripped from the porous surface.

More particularly, it is an object of the present invention to provide a solution which, when sprayed on the porous surface to be protected, will form over the article a web-like, fibrous protective barrier which will adhere to the porous surface thereof without bonding thereto or affecting the surface physically or chemically. The protective web-like barrier then forms a base for the reception of a continuous film coating applied in liquid form, preferably also by spraying, the film coating bonding with the web-like barrier and combining therewith to form an effective strippable protective coating for the surface.

Another object of the invention is the provision of a liquid coating composition which can itself be used for the formation of both the web-like barrier and the film overcoating.

It is a further object of the invention to provide a coating material which dries more rapidly and is more stable than a water emulsion of latex.

An additional object of the invention is to provide a method for applying such a coating to a porous surface which eliminates the need for first applying another substance to the surface for the purpose of preventing the coating from being absorbed into the porous surface.

I have found that a novel coating material achieving the aforesaid objects comprises a solution of a high molecular weight polymeric resin in a solvent medium, the term "solvent medium" being used herein to denote a mixture of one or more miscible solvents and diluents. It is essential to the success of the material that much of the solvent medium be of sufficiently high volatility to evaporate during fine spraying of the coating material upon a porous surface. This causes the coating material, when divided into minute particles as it is sprayed toward the porous surface, to lose much of its solvent in transit, immediately precipitating the resin onto the porous surface as a web or flocking which is too dry to be absorbed thereby. This layer of coating material is left on the surface as an undercoat which, while not sufficient in itself to form a tough protective coating for the surface, has the advantage of being readily strippable as a result of having been deposited in too dry a condition to penetrate into porous surface.

It is also desirable that a large enough part of the solvent medium be of sufficiently low volatility to permit a wet overcoat of the same coating material to be applied, as by coarser spraying or any other method, over the dry barrier undercoat. This permits the application thereover of coating material in liquid form which will dry to form a continuous tough film coating. It also permits the liquid solvent in the wet overcoat to react with the dry undercoat to some extent and thereby bond the undersurface of the set overcoat to the outer surface of the dry undercoat by molecular interpenetration as the wet overcoat dries.

However, it is also desirable that the solvent medium be of sufficiently high volatility so that when a wet overcoat is deposited over a dry undercoat the solvent medium evaporates before it can penetrate through the dry undercoat to reach the porous surface below, and so that the wet overcoat quickly becomes bonded to the dry undercoat and can soon dry to form a tough film. In this way the wet overcoat is prevented from contacting the porous surface, avoiding absorption of the coating material and the attendant difficulty in peeling. In addition this provides a fast-drying coating which stays in wet condition just long enough to be applied over the dry undercoat and to become bonded thereto, and dries without unduly delaying the fabrication process.

Additional objects and advantages of the invention will become apparent during the course of the following detailed description of the invention when taken in connection with the accompanying drawings, in which:

FIG. 1 is a perspective view of a shoe upper and a spray nozzle being used to apply a dry, web-like barrier undercoat thereon;

FIG. 2 is an enlarged cross-sectional view of the shoe upper taken along line 2—2 of FIG. 1 and showing the undercoat applied thereon;

FIG. 3 is a perspective view of the shoe upper covered by the undercoat webbing, and showing the nozzle of FIG. 1 being used to spray a wet overcoat film upon the undercoat to form a protective coating;

FIG. 4 is an enlarged cross-sectional view of the shoe upper carrying the complete protective coating, as taken along the lines 4—4 of FIG. 3; and FIG. 5 is a perspective view of a portion of a completed shoe fabricated from the shoe upper of FIGS. 1–4 with the protective coating of FIGS. 3 and 4 in the process of being stripped therefrom.

A porous surface to be protected during various fabrication processes is presented by a shoe upper 10 which is to be incorporated into a woman's shoe. The upper 10 may be made of leather, suede, fabric, or other porous material conventionally used in shoe uppers. The surface 10a will be the outer surface of the shoe when the fabrication thereof has been completed, and it is this surface which is to be protected. The protective coating is to be applied to prevent soiling, scarring, or other damage to the shoe upper during the lasting operation or subsequent shoe manufacturing processes, and for this purpose should be made to adhere to the outer surface of the upper while at the same time to be capable of being readily peeled therefrom at the conclusion of such operations.

As is typical with shoe uppers, a decorative attachment 12 is affixed to the visible surface 10a to enhance the appearance of the shoe. The decorative attachment 12 presents a highly convoluted configuration, and thus raises the problem of keeping the protective coating from entering the crevices and hollows thereof to an extent which might make subsequent peeling of the coating difficult.

To apply the protective coating, the liquid coating material of the invention is sprayed through a nozzle 14 adjusted for a fine spray or held at a sufficiently great distance from shoe upper 10 to cause vaporization of the more volatile elements of the solvent medium between the time the liquid leaves the nozzle 14 and the time that it reaches the surface 10a to be coated. The initial portion 16 of the spray just emerging from the nozzle 14 is in the form of a liquid stream. Further on, this is transformed into an intermediate portion 18 which consists of semi-solid fibers as the solvent content diminishes. At the terminal portion 20 where the spray nears the protected surface 10a and is most widely dispersed, the fibers crumble into shorter fibrous particles as the solvent content becomes still lower. These fibrous particles are deposited on the protected surface 10a in a random network pattern to form a substantially dry, web-like barrier 22 which clings to, but is not absorbed by the protected surface 10a and therefore remains peelable. However, the fibrous particles are moist enough to blend with each other to form an integral sheet-like cover closely resembling thin tissue paper in appearance and texture. Spraying a sufficient amount of the material will insure that no large interstices will be left between fibers through which a subsequent wet overcoat might reach the protected surface 10a.

The fibrous configuration of the flocking particles causes them to be laid across and bridge the crevices or hollows of the protected surface 10a, such as those presented by the convoluted decorative attachment 12. As best seen in FIG. 2, this causes the web-like barrier to fit the convolutions of the decorative attachment 12 as an envelope rather than as a skin, engaging only the prominences of the ornamentations and not running or sinking into the depressions. This is an advantage of the present invention which enhances the ready peelability of the coating even on broken and interrupted surfaces.

In the preferred form of the invention, the nozzle 14 is next adjusted for a coarser spray or is moved closer, as seen in FIG. 3, and the same coating material is sprayed over the web-like barrier 22. This time the second spray 24 reaches its target in a wet condition and a tough, semi-clear, smooth plastic outer film 26 is formed thereby to protect the shoe upper 10 during fabrication. The outer film 26 bonds to the web-like barrier 22 to form a unified protective coating 28 which assumes the envelope configuration of the web-like barrier 22, as seen in FIG. 4. However, the undersurface of the protective coating 28 retains the dry, peelable characteristics of the web-like barrier 22, thus enabling the protective coating 28 to be readily peeled from the completed shoe 30 after fabrication, in the manner illustrated in FIG. 5.

One way of achieving the correct balance of volatility levels in the solvent medium is by constituting the greater part of the solvent medium of low boiling point solvents and diluents, plus either medium or high boiling point solvents or both. All solvents and diluents are chosen for their ability to effect the solution of the particular resin employed and are miscible with each other. The low boiling point solvents and diluents, such as acetone, hexane, heptane, methylene chloride, methylethyl ketone, and aliphatic naphtha, are further chosen for their ability to evaporate so rapidly that when the coating material is sprayed in finely divided form or even in coarse form, they will vaporize by the time the spray reaches the porous surface. The medium boiling point solvents, such as toluene, are chosen for their ability to evaporate at a rate which is great enough to cause these solvents to vaporize completely during fine spraying, but which is also low enough to cause these solvents to deposit on the porous surface in liquid form when sprayed thereon in a relatively coarse form. The high boiling point solvents, such as methylisobutyl ketone and mesityl oxide, are chosen for their ability to evaporate at a rate which is low enough to cause these solvents to strike the porous surface in liquid form however they are sprayed, but which is also high enough to cause the coating material to dry soon after it is deposited. It is not necessary that each of these types of solvents be present in each composition. It is only necessary to achieve a proper balance of solvents and diluents in order to achieve the following:

(1) A sufficiently great part of the solvent medium must vaporize upon fine spraying to allow the resin to precipitate upon the porous surface as a substantially dry undercoat in the form of a fibrous web which cannot be absorbed into the surface.

(2) In its preferred form, where the same solution is used for the formation of both the undercoating and overcoating, a part of the solvent medium, although vaporizing when finely sprayed, must be capable of being deposited in liquid form when more coarsely sprayed in order to form a wet overcoat. This part must be further adapted to maintain the overcoat in wet condition long enough to react with the outer surface of the dry undercoat and thereby become bonded thereto, but must vaporize soon enough to prevent penetration entirely through the dry undercoat and consequent absorption by the porous surface, and to promote rapid drying of the protective coating and bonding together of the two layers thereof.

(3) A sufficiently great part of the solvent medium must vaporize even upon coarse spraying to prevent the wet overcoat from dissolving its way through the dry undercoat and being absorbed by the porous surface.

In some instances, it is desirable that a sufficiently great part of the solvent medium remain in liquid form even during fine spraying for moistening the finely sprayed undercoat in order to inhibit excessive precipitation and fragmentation thereof, and also in order to promote bonding of the wet overcoat to the dry, web-like barrier. Such solvent must of course evaporate rapidly enough or else constitute a sufficiently small part of the solvent medium to assure that when the coating material is sprayed on as an overcoat the solvent medium will not penetrate the undercoat or unduly delay drying of the overcoat.

The drying rate of a given part of the solvent medium depends upon both its concentration in the coating material and its volatility, so that adjustment of either variable will affect the result. The exact choice of solvents and diluents primarily depends upon the resin to be employed, and their concentrations may then be adjusted in view of the volatilities of the various constituents so chosen. A great range of mutual adjustments between these constituents may be resorted to in order to practice the present invention, but I have found that generally the limits of active low and medium boiling point solvents should be from 50% to 75%, the limits of diluents should be from 25% to 50%, and the limits of high boiling point solvents (when used) should be from 5% to 25%, these percentages representing parts of the total solvent medium by weight.

The resins which may be employed in compositions in accordance with the present invention include, without limitation, vinyl resins such as vinyl chloride acetate copolymers, polyvinyl acetate, partially hydrolized vinyl chloride acetate, polyvinyl butyral, and saran or vinylidene chloride copolymers, as well as other types of resins, for example cellulosic resins such as cellulose acetate butyrate and ethyl cellulose, acrylic polymer and other acrylic resins such as methyl methacrylate, and butyrate resins.

I have further found that various additives may be included in the coating material to improve the results obtained therewith. A lubricant, which may consist of an oil such as mineral oil or tall oil or an oily acid such as oleic or stearic acids, can be added to the coating material as a means of inhibiting undue adhesion of the undercoat to the porous surface and thus making the protective coating more easily peelable. The upper limit of lubricant is about 15% of the coating material by weight.

It is sometimes advisable to add to the coating material a plasticizer to enhance the plasticity of the protective coating, increasing its elongation and therefore rendering it easier to peel. Plasticizing substances suitable for such purpose include fatty phthalic acid esters, polyester plasticizers, dioctyl phthalate, epoxidized soya oil, butyl benzyl phthalate, hydrocarbon plasticizers, non-drying alkyd, chlorinated biphenyl, castor oil, and butyl stearate. Care should be taken, however, when a migratory plasticizer such as dioctyl phthalate is used. Migration may cause the plasticizer to reach and attack the porous surface. Since migratory plasticizers are desirable in that they impart more stretchability to the protective coating than do the non-migratory ones, it is often preferable to employ a migratory plasticizer together with a non-migratory one such as epoxidized soya oil, polyester plasticizers, or hydrocarbon plasticizers in order to strike a balance between stretchability and protection of the porous surface.

It is also possible to add to the basic film-forming resin a higher molecular weight polymer which is either incompatible or compatible therewith as a means of promoting precipitation of the dry undercoat. Examples of substances useful in this manner are vinyl chloride acetate copolymer, and polystyrene.

When the heavier polymer is incompatible, the upper limit thereof is about 10% of the coating material by weight. Such an incompatible heavier polymer and the constituents of the solvent medium may be selected in relation to each other so that at least the greater part of the solvent medium is a non-solvent for the heavier polymer, thus enhancing the tendency of the heavier polymer to precipitate. However, in order to permit such an incompatible heavier polymer to enter into solution, either a lesser part of the solvent medium in which the basic film-forming resin is dissolved should also be a solvent for the heavier polymer, or else an additional solvent specifically for the heavier polymer should be incorporated into the coating material. Where polystyrene is used as an incompatible heavier polymer, for example, tetrahydrofuran may be added therewith to the coating material.

While the present invention includes a great range of formulations, for purposes of explanation a number of illustrative specific formulations which are presently preferred will now be given. The following is an illustrative example of a formulation employing vinyl resins as the film-forming materials:

*Example 1*

| | Parts by weight |
|---|---|
| Vinyl chloride acetate copolymer VYHH | 57.5 |
| Vinyl chloride acetate copolymer VYNS | 7.5 |
| Fatty phthalic acid esters ("Ohopex Q-10") | 13.0 |
| Mineral oil | 1.5 |
| Hexane | 60.0 |
| Acetone | 180.0 |
| Methylisobutyl ketone | 60.0 |

VYHH, a product of Union Carbide Corp. is a copolymer of vinyl chloride and vinyl acetate in a ratio of 87 to 13. The vinyl chloride acetate VYNS, also a product of Union Carbide Corp., is a copolymer of vinyl chloride and vinyl acetate in a ratio of 90 to 10. Ohopex Q-10 is a product of Ohio-Apex, Inc. and is an octyl, fatty phthalic acid ester of specific gravity 0.952, with a boiling range of 215-235° C.

In this example, the vinyl chloride acetate copolymer VYHH is the basic film-forming resin. The VYNS copolymer is added because of its high molecular weight, providing added strength to the film formed over the web. It also provides a more viscous solution at the same concentration, producing a better webbing effect during the initial spraying.

The ability of the solution to form a substantially dry web during the initial spraying operation and a wet film during the subsequent spraying operation is provided by the use of both acetone and methylisobutyl ketone (MIBK) as solvents. The acetone has a low boiling point for providing the webbing, while the methylisobutyl ketone has a high boiling point for the formation of a film covering over the web.

The hexane serves as a diluent and acts as a carrier for the powdered resin during the initial mixing of the product, forming a slurry and aiding in dissolving of the resin without the formation of lumps. The hexane is highly volatile so that it aids in forming a highly concentrated solution during spraying.

The fatty phthalic acid esters are plasticizing agents and are added in sufficient amounts to lower the viscosity of the solution as desired.

The mineral oil is a lubricant and, by forming a barrier between the deposited web and the protected surface, prevents the web from bonding to the surface. Because the mineral oil is incompatible with the other ingredients of the solution, it tends to precipitate out upon the protected surface, thereby causing the plastic film to pull away from the protected surface. The amount of mineral oil is so regulated that it will not stain the material being coated.

Another example, utilizing the same resins, is as follows:

*Example 2*

| | Parts by weight |
|---|---|
| Vinyl chloride acetate copolymer VYHH | 53.0 |
| Vinyl chloride acetate copolymer VYNS | 12.0 |
| Polyester plasticizer | 13.0 |
| Dioctyl phthalate | 2.0 |
| Methylene chloride | 60.0 |
| Acetone | 180.0 |
| Methylisobutyl ketone | 60.0 |

In this formulation, the presence of methylene chloride along with the acetone as an additional low boiling solvent has the effect of making the solution and spray nonflammable, although it is toxic. The nonflammability results from the fact that the methylene chloride evaporates at about the same rate as the acetone solvent. The dioctyl phthalate serves, in this instance, as the plasticizer, while the polyester is also a plasticizer and serves to prevent excessive migration of the dioctyl phthalate.

The following formula illustrates the use of an incompatible polymer for extreme webbing effects:

*Example 3*

| | Parts by weight |
|---|---|
| Vinyl chloride acetate copolymer VYHH | 53.0 |
| Vinyl chloride acetate copolymer VYNS | 12.0 |
| Epoxidized soya oil | 13.0 |
| Dioctyl phthalate | 3.0 |
| Hexane | 30.0 |
| Toluene | 30.0 |
| Acetone | 180.0 |
| Methylisobutyl ketone | 60.0 |
| Molding grade polystyrene | 2.0 |
| Tetrahydrofuran | 8.0 |

The polystyrene is incompatible with the two vinyl resin copolymers and thus promotes rapid precipitation to form a web. The toluene is a medium boiling point solvent used to lower the viscosity, which would otherwise be too high because of the presence of the heavy polystyrene. The tetrahydrofuran is a solvent for the polystyrene necessary to produce a reasonable viscosity. Once again dioctyl phthalate is the plasticizer, this time epoxidized soya oil being used as a second plasticizer controlling the migration of dioctyl phthalate. The extreme webbing produced during the initial spraying operation is beneficial in the coating of very porous materials such as various types of suedes. Despite the extreme inherent webbing tendency of the solution, it may still be used to produce a film coating during the second spray operation.

The following formulation illustrates the use of a basic film-forming resin which is not a chloride as in the previous examples:

*Example 4*

| | Parts by weight |
|---|---|
| Polyvinyl acetate AYAT | 15.0 |
| Butyl benzyl phthalate ("Santicizer 160") | 3.0 |
| Partially hydrolized vinyl chloride acetate VAGH | 5.0 |
| Molding grade polystyrene | 1.5 |
| Heptane | 30.0 |
| Acetone | 60.0 |
| Mesityl oxide | 10.0 |
| Tetrahydrofuran | 10.0 |

"Santicizer 160" is a product of Monsanto Chemical Company and consists of butyl benzyl phthalate with a specific gravity of 1.114. Polyvinyl acetate AYAT is a product of Union Carbide Corp. and is 100% polyvinyl acetate having an intrinsic viscosity of 0.69 at 20° C.

In this example, the basic film-forming resin is a polyvinyl acetate rather than a chloride. The vinyl chloride acetate copolymer VAGH is substantially compatible with the acetate but causes the formation of a tougher film by virtue of its higher molecular weight. The incompatible polystyrene promotes webbing, and tetrahydrofuran is used to make a solution of polystyrene which is not too viscous. Butyl benzyl phthalate is added as a plasticizer.

In this instance, the mesityl oxide is the high boiling point solvent and is used instead of the methylisobutyl ketone because it is slightly less volatile and tends to slow down the webbing tendency slightly. A heavier paraffinic diluent, heptane, is used in place of hexane for the same reason.

This formulation will produce a somewhat more flexible film of a lower modulus which is useful for some applications. There is slightly more webbing tendency than in the previous examples because acetate resins are not as readily adaptable to spray operations.

The following example illustrates the use of butyral plastics as the film-forming resins:

*Example 5*

| | Parts by weight |
|---|---|
| Polyvinyl butyral XYLF | 15.0 |
| Polyvinyl butyral B-72-A or XYSG | 7.5 |
| Dioctyl phthalate | 2.0 |
| Hexane | 20.0 |
| Toluene | 10.0 |
| Acetone | 60.0 |
| Tetrahydrofuran | 10.0 |
| Hydrocarbon plasticizer ("Dutrex 20") | 2.0 |

XYLF is a product of Union Carbide Corp. and consists of polyvinyl butyral having an intrinsic viscosity of 0.8. B-72 Acryloid is a product of Rohm & Haas Company, consisting of methyl methacrylate resin with a specific gravity of 0.97. "Dutrex 20" is a hydrocarbon oil produced by Shell Oil Company and having a specific gravity of 1.3 and an initial boiling point of 182° C.

In this example, the polyvinyl butyral XYLF is of relatively low molecular weight while the B-72-A is of relatively high molecular weight to promote webbing. The tetrahydrofuran is a solvent for the B-72-A, and toluene is a medium boiling point solvent. Both are used to obtain a practical viscosity for the solution. Dioctyl phthalate is a plasticizer, and the hydrocarbon is also a plasticizer and deters migration of the dioctyl phthalate. The butyrals form an extremely tough film and produce a better webbing effect than the vinyls.

The following is an example of the use of an acrylic polymer as the basic film-forming resin:

*Example 6*

| | Parts by weight |
|---|---|
| Acrylic polymer ("Acriloid A-101") | 125.0 |
| Partially hydrolized vinyl chloride acetate VAGH | 50.0 |
| Dioctyl phthalate | 15.0 |
| Mineral oil | 2.5 |
| Aliphatic naphtha, boiling point 150°-157° F. | 141.0 |
| Methylisobutyl ketone | 47.0 |
| Acetone | 207.0 |

"Acriloid A-101" is a methyl methacrylate resin of specific gravity 1.03 made by Rohm & Haas Company. VAGH, a product of Union Carbide Corp., is a copolymer of vinyl chloride, vinyl acetate, and vinyl alcohol in respective ratios of 91 to 3 to 6, and with an intrinsic viscosity of 0.57 at 20° C. EAB-381-20, a product of Eastman Chemical Products, Inc., is a cellulose acetate butyrate resin with a butyral content of 38%.

The vinyl copolymer is added as a higher molecular weight resin promoting webbing. Mineral oil is again added to precipitate as a film on the protected surface which deters bonding of the coating thereto. Dioctyl phthalate is again the plasticizer, while aliphatic naphtha is employed in place of hexane or heptane as a diluent.

This formulation provides very good webbing tendencies, but the final coating produced is more brittle and of a more papery quality than in the previous examples. The more papery character of the web is sufficient to deter migration of the dioctyl phthalate without the addition of a second non-migratory plasticizer.

The following example illustrates the use of a butyrate as the basic resin in a formulation made in accordance with the invention.

*Example 7*

| | Parts by weight |
|---|---|
| Half-second butyrate | 80.0 |
| Cellulose acetate butyrate EAB-381-20 | 20.0 |
| Non-drying alkyd | 25.0 |
| Dioctyl phthalate | 10.0 |
| Acetone | 270.0 |
| Methyl alcohol | 54.0 |
| Hexane | 162.0 |
| Methylisobutyl ketone | 54.0 |

Butyrate films are ordinarily hard and tough, but when the butyrate is modified to make the film stretchable and flexible, as is required for the type of coating contemplated, it tends to tear. The butyrate plastic has good webbing tendencies, but the web produced is brittle and papery, and does not have the "give" provided by the vinyl web. The nondrying alkyd serves as a plasticizer, while cellulose acetate butyrate is a heavier resin added to promote webbing, and methyl alcohol serves as a low boiling point solvent for the cellulose acetate butyrate.

The following example illustrates the use of ethyl cellulose as the film-forming resin.

Example 8

| | Parts by weight |
|---|---|
| Ethyl cellulose N–100 | 12.5 |
| Chlorinated biphenyl | 12.5 |
| Mineral oil | 2.5 |
| Castor oil | 3.8 |
| Aliphatic naphtha, boiling point 200°–232° F. | 62.6 |
| Acetone | 50.0 |
| Methylisobutyl ketone | 12.5 |

Ethyl cellulose N–100, a product of Hercules Powder Company, is an ethyl cellulose polymer having an ethoxy content of 47.5–49.0%.

Again mineral oil is added as a lubricant to deter bonding and aliphatic naphtha is a diluent. Chlorinated biphenyl and castor oil are used as plasticizers.

As was the case in the previous example, the web formed here has the disadvantage of being "papery" in quality.

The following example illustrates the use of saran as the film-forming plastic:

Example 9

| | Parts by weight |
|---|---|
| Vinylidene chloride copolymer (saran) F–120 | 100.0 |
| Methyl methacrylate | 40.0 |
| Butyl stearate | 5.0 |
| Acetone | 152.0 |
| Methylethyl ketone | 152.0 |
| Hexane | 76.0 |

"Saran F–120" a product of Dow Chemical Company, is a polyvinyl and acrylonitrile copolymer.

The Saran is a high molecular weight resin which webs easily, but the web produced is somewhat papery. The methyl methacrylate is a lower molecular weight resin which lightens the resin mixture and is added for its tendency to form a film for use in the over-coating. Methylethyl ketone is a low boiling point solvent which dissolves the Saran. Butyl stearate serves both as a plasticizer and as a lubricant to deter bonding.

It is also contemplated, when suitable, to add to any of these spraying solutions an inorganic pigment such as iron oxide or titanium dioxide in the amount of 5 to 15% by weight of solids content. This pigment has the function of increasing the dryness of the formed web and preventing the porous surface from becoming unduly moistened by keeping the coating in an open condition so that the solvent or solvents can work to the surface and evaporate. The pigment also stays in the film-forming portion of the formulation and permits the operator to determine visually when the shoe is completely covered by the film coating.

All of the above examples are formulations which may be used both for the formation of the web and for the formation of the film coating over the web. In the formation of the web, the spray nozzle is held from 8 to 10 inches from the material to be coated. The greater the distance, the better the webbing, but at a greater distance than ten inches there is an undue loss of material which is undesirable as a practical consideration. For the formation of the film, the spray nozzle is held spaced a maximum of six inches from the coating surface.

It will be appreciated that a web barrier may be applied in accordance with the procedures and utilizing any of the formulations mentioned above, and a coating of a different material applied thereover. A good film coating for this purpose may be formed by a waterbase latex which may be either a natural rubber latex or a synthetic latex polymer. An example of such a latex compound is as follows:

Example 10

| | Parts by weight |
|---|---|
| Acrylic latex emulsion | 100.0 |
| Methyl cellulose 100 cps. 5% water solution | 10.0 |
| Methylisobutyl ketone | 3 to 5 |

The latex emulsion will be readily strippable because of the non-adhesion between the protected surface and the dry web barrier. However, it will be appreciated that the type of solvent employed in the coating material of the present invention will dry far more rapidly when used for the outer coat than would the water base of a latex emulsion. An additional advantage arises from the fact that, as a solution, the present coating material is more stable than an emulsion.

The method of making a coating material in accordance with the present invention may be illustrated by reference to Formulation 3, which contains many of the additives previously discussed and is designed for a rather high degree of precipitation of the dry undercoat. The basic film-forming vinyl resins are dissolved in a mixture of hexane and toluene with agitation. Then the dioctyl phthalate and epoxidized soya oil plasticizers are added, followed by the acetone and methylisobutyl ketone. The molding grade polystyrene is first dissolved separately in tetrahydrofuran and the resulting solution is then added to the first preparation. The other formulations may be prepared in a similar manner with the aid of techniques well known in the art.

In order to apply a coating material in accordance with the present invention to a porous surface to form a protective coating thereon, it is not necessary to first apply an initial coating of any other substance. In particular, no powder or coagulating acid is required, as this coating material is adapted to form its own undercoat which can be applied directly to a bare porous surface without adhering thereto. As an advantageous result, only one coating substance need be kept available for forming protective coatings. It is therefore necessary to employ only a single spray container having therein a coating material in accordance with the present invention.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What is claimed is:

1. A coating composition consisting essentially of polymeric resin material selected from the group consisting of vinyl, cellulosic and acrylic resins, in a liquid solvent mixture comprising 50 to 75% by weight of a true solvent for said resin material having a volatility in the range of the volatilities of acetone, methylene chloride, methanol, and methyl ethyl ketone, and 5 to 25% by weight of another true solvent for said resin material having a volatility in the range of the volatilities of methylisobutyl ketone and mesityl oxide.

2. A method of forming a strippable protective coating on a porous surface comprising spraying said surface with a coating composition as defined in claim 1 in a sufficiently fine form and from a sufficient distance to form a web-like barrier coat of polymeric resin material thereon, then spraying said coating composition in a sufficiently coarse form and from a sufficient distance to form a liquid film on said barrier coat, and permitting said liquid film to dry and bond with said barrier coat to form a unified strippable protective coating on said porous surface.

3. A coating composition consisting essentially of polymeric resin material selected from the group consisting of vinyl, cellulosic and acrylic resins, in a liquid solvent mixture comprising 50 to 75% by weight of a true solvent for said resin material having a volatility in the range of the volatilities of acetone, methylene chloride, methanol, and methyl ethyl ketone, 5 to 25% by weight of another true solvent for said resin material having a volatility in the range of the volatilities of methylisobutyl ketone and mesityl oxide, and 25 to 50% of a nonsolvent diluent miscible with said true solvents.

4. A method of forming a strippable protective coating on a porous surface comprising spraying said surface with a coating composition as defined in claim 3 in a sufficiently fine form and from a sufficient distance to form a web-like barrier coat of polymeric resin material thereon, then spraying said coating composition in a sufficiently coarse form and from a sufficient distance to form a liquid film on said barrier coat, and permitting said liquid film to dry and bond with said barrier coat to form a unified strippable protective coating on said porous surface.

References Cited in the file of this patent

UNITED STATES PATENTS

| | | |
|---|---|---|
| 2,431,684 | Brophy | Dec. 2, 1947 |
| 2,441,227 | Pineles | May 11, 1948 |
| 2,480,824 | Murphy et al. | Sept. 6, 1949 |
| 2,634,216 | Pineles et al. | Apr. 7, 1953 |
| 2,651,856 | Newton | Sept. 15, 1953 |
| 2,651,857 | Griswold et al. | Sept. 15, 1953 |
| 2,941,974 | Reymann et al. | June 21, 1960 |
| 2,946,702 | Bach | July 26, 1960 |